United States Patent
Edpalm et al.

(10) Patent No.: US 10,593,047 B2
(45) Date of Patent: Mar. 17, 2020

(54) SETTING OF A MOTION TRIGGER LEVEL

(71) Applicant: Axis AB, Lund (SE)

(72) Inventors: Viktor Edpalm, Lund (SE); Axel Keskikangas, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 16/224,270

(22) Filed: Dec. 18, 2018

(65) Prior Publication Data

US 2019/0197702 A1 Jun. 27, 2019

(30) Foreign Application Priority Data

Dec. 21, 2017 (EP) .................................. 17209245

(51) Int. Cl.
G06T 7/246 (2017.01)
H04L 29/06 (2006.01)
G06T 7/20 (2017.01)

(52) U.S. Cl.
CPC ............. G06T 7/246 (2017.01); G06T 7/20 (2013.01); H04L 65/607 (2013.01); G06T 2207/10016 (2013.01); G06T 2207/20021 (2013.01); G06T 2207/30232 (2013.01)

(58) Field of Classification Search
CPC .......... G06T 7/246; G06T 2207/30232; G06T 2207/20021; H04L 65/607
See application file for complete search history.

(56) References Cited

U.S. PATENT DOCUMENTS

| 6,959,044 | B1* | 10/2005 | Jin | .................. H04N 19/172 |
| | | | | 348/699 |
| 9,589,595 | B2* | 3/2017 | Gao | .................. G06K 9/00664 |
| 10,084,972 | B2* | 9/2018 | Alm | ..................... G06K 9/3241 |
| 2013/0094587 | A1 | 4/2013 | Urban et al. | |

OTHER PUBLICATIONS

Dimitrova et al., "Motion Recovery for Video Content Classification," ACM Trans. Inf. Systems. vol. 13. No. 4, pp. 408-439 (1995).
"PoC: Poor man's high framerate full HD motion detection—Raspberry Pi Forums", (Nov. 13, 2013). Available at: https://www.raspberrypi.org/forums/viewtopic.php?t=60835.

(Continued)

Primary Examiner — Tsion B Owens
(74) Attorney, Agent, or Firm — Volpe & Koenig, P.C.

(57) ABSTRACT

A method for setting a motion trigger level is used in detection of motion in a video stream depicting a scene which includes receiving data pertaining to a video stream depicting the scene; dividing the scene into a plurality of specific portions; wherein each image frame of the video stream comprises multiple blocks of pixels, wherein each specific portion of the scene is associated with one or more block of pixels; and for each specific portion of the scene: evaluating, over time, statistical features of bitrate associated with an encoding of block of pixels pertaining to the specific portion of the scene; determining a motion base level based on the evaluated statistical features of bitrate associated with the encoding of block of pixels pertaining to the specific portion of the scene; and setting a motion trigger level based on the motion base level.

19 Claims, 6 Drawing Sheets

(56) References Cited

OTHER PUBLICATIONS

McCloskey et al., "Activity detection in the wild using video metadata," Proceedings of the 21st International Conference on Pattern Recognition (ICPR2012), Tsukuba, pp. 3140-3143 (Nov. 11-15, 2012).

Soyak et al., "Content-aware H.264 encoding for traffic video tracking applications," 2010 IEEE International Conference on Acoustics, Speech and Signal Processing, Dallas, TX, pp. 730-733 (2010).

Meuel et al., "Low bit rate ROI based video coding for HDTV aerial surveillance video sequences," IEEE Computer Society Conference on Computer Vision and Pattern Recognition Workshops (2011).

\* cited by examiner

SETTING OF A MOTION TRIGGER LEVEL

TECHNICAL FIELD

The present invention relates to a method and circuitry for setting a motion trigger level to be used in detection of motion in a video stream depicting a scene.

BACKGROUND

Monitoring equipment is used in all sorts of environments in society. In its simplest form, a video stream of a scene is observed by personnel and alerts are subsequently raised manually. By automating the monitoring, a more cost-effective and robust monitoring system may be achieved. Often, most features of interest in a monitoring system are related to motion in the scene. In general, reliable and robust automatic motion detection is difficult to achieve.

A simple algorithm for motion detection is to compare a current image with a reference image and simply register the changes in pixel intensity levels. However, this simple algorithm may be prone to trigger false alarms due to changes related to irrelevant motion, such as swaying trees or waves on puddles. False alarms may, in turn, result in increased costs related to the response.

In order to reduce the number of false alarms different filters may be used. Some examples of filters are small object filtering and swaying object filtering. Implementation of such filter may be complex and even after using them the number of false alarms may be too high.

SUMMARY

Reduction of the above problems by providing a method for setting a motion trigger level to be used in detection of motion in a video stream depicting a scene would be desirable.

According to a first aspect, this and other objects are achieved by a method for setting a motion trigger level to be used in detection of motion in a video stream depicting a scene. The method comprises: receiving data pertaining to a video stream depicting the scene; dividing the scene into a plurality of specific portions, wherein each image frame of the video stream comprises multiple blocks of pixels, wherein each specific portion of the scene is associated with one or more block of pixels; and for each specific portion of the scene: evaluating, over time, statistical features of bitrate associated with an encoding of block of pixels pertaining to the specific portion of the scene; determining a motion base level based on the bitrate associated with the encoding of block of pixels pertaining to the specific portion of the scene; and setting a motion trigger level based on the motion base level.

By means of the present method it is possible to set a motion trigger level for a specific portion of a scene.

The received data pertaining to a video stream depicting the scene may comprise data pertaining to the video stream itself. Hence, data of video frames of the video stream. This data may subsequently be encoded using video coding. This in order for the video stream to take less storage space upon storing of the video stream on a digital storage medium and/or less bandwidth upon transmitting the video stream over a digital network. During the encoding two main modes are typically used to compress a video frame of the video stream of video frames: the Intra-mode and the Inter-mode. During Intra-mode spatial redundancy is exploited, i.e. correlation among pixels within one frame. During Inter-mode temporal redundancy in between frames are exploited. Usually, a frame to be encoded is partitioned into independent blocks of pixels being compressed and encoded individually. According to a non-limiting example, a block of pixels may comprise one or more coding units. A coding unit may e.g. be a macroblock or a coding tree unit. Other representations of a coding unit may be used. For forming temporally independent frames, so called intra frames, only intra coding is used. Hence, all blocks of pixels in the frame are intra coded. For forming temporally dependent frames, so called inter frames (e.g. H.264 P- and B-frames), intra coding as well as inter coding may be used. Hence, at least some of the blocks of pixels in the frame are inter coded. However, for inter frames one or more of the blocks of pixels may be intra coded. As a result of the encoding, bitrates for the different blocks of pixels may be determined.

Alternatively, or additionally, the received data pertaining to a video stream depicting the scene may comprise data pertaining to bitrates associated with an encoding of block of pixels of the video stream.

By dividing the scene into a plurality of specific portions, different motion base levels may be determined for different specific portions of the scene. For example, it may be possible to determine one motion base level for a driveway, and another for a couple of trees present in the scene.

By dividing the scene into a plurality of specific portions, different motion trigger levels may be set for different specific portions of the scene. For example, it may be possible to set one motion trigger level for a driveway, and another for a couple of trees present in the scene.

By associating each block of pixels to a specific portion of the scene, the shape of the specific portion may be freeform. For example, the specific portion may outline the shape of a couple of trees.

By evaluating, over time, statistical features of bitrate associated with the encoding of block of pixels, the motion base level may be determined based on information gathered over an extended period of time.

By evaluating, over time, statistical features of bitrate associated with the encoding of block of pixels pertaining to the specific portion of the scene, the motion base level may be determined in relation to a level of motion usually present in the specific portion of the scene. For example, a specific portion of a scene including motion associated with tree leaves constantly moving in the wind may influence the motion base level in the specific portion accordingly. A specific portion of a scene including no motion, e.g. an empty driveway, may influence the motion base level in the specific portion.

By evaluating, over time, statistical features of bitrate associated with the encoding of block of pixels pertaining to the specific portion of the scene, the motion base level may not be influenced by real events occurring. A real event may not be noticeable in the statistical features, evaluated over time, of the bitrate associated with the encoding of a block of pixels pertaining to the specific portion of the scene, and may not influence the motion base level in the specific portion of the scene. This is beneficial since the motion base level may be determined in a setting where real events may occur. The motion base level may be determined during normal monitoring of the scene, and may not require a calibration set-up where no real events occur. The motion base level may be determined during normal monitoring of the scene, where real events occurs occasionally.

"Real events" is to be construed as events where a motion trigger is desired.

High bitrates associated with the encoding of block of pixels pertaining to a specific portion of the scene may be related to one or more of the following: complex details, noise, patterns, movement, and encoder settings. High bitrates may further imply large changes between frames in the video stream. Large changes between frames do not necessarily indicate that the change is of interest. Large changes between frames may imply high motion levels in the scene. High motion levels do not reveal if the motion is of interest or not. The motion base level may be determined in relation to normal level of motion in the specific portion of the scene. The motion base level may be determined as a representation of statistical features, evaluated over time, of the motion level in the specific portion of the scene. The motion trigger level may be set in relation to normal level of motion in the specific portion of the scene.

"Statistical features" is to be construed as one or more of the following: mean, weighted mean, arithmetic mean, weighted arithmetic mean, moving mean, moving weighted mean, variance, moving variance, standard deviation, moving standard deviation, geometric mean, moving geometric mean, weighted geometric mean, moving weighted geometric mean, geometric standard deviation, moving geometric standard deviation, harmonic mean, moving harmonic mean, weighted harmonic mean, moving weighted harmonic mean, median, moving median, weighted median, moving weighted median, quartiles, quartile range, and mode.

The statistical features of bitrate associated with the encoding of block of pixels may primarily be acquired from inter coded frames. Preferably, the statistical features of bitrate associated with the encoding of block of pixels is solely acquired from inter coded frames.

The bitrate associated with the encoding of block of pixels acquired from inter coded frames may be related to changes in the scene. High bitrate associated with inter coded frames may imply large changes between frames in the video stream. Large changes between frames do not necessarily indicate that the change is of interest. Large changes between frames may imply high motion levels in the scene. High motion levels do not reveal if the motion is of interest or not. The bitrate associated with the encoding of block of pixels acquired from intra coded frames may be related to complexity of the scene.

For example, a specific portion of a scene comprising an empty driveway may have high bitrate associated with an encoding of intra-coded frames, i.e. there may be, e.g., complex details in the driveway. The specific portion of the scene comprising an empty driveway may further have a low bitrate associated with an encoding of inter-coded frames, i.e. there may be small changes in the driveway. Thus, the motion base level in the specific portion comprising an empty driveway may be low.

For example, a specific portion of a scene comprising swaying trees may, depending on the complexity of the specific portion of the scene, have high or low bitrate associated with an encoding of intra-coded frames. Further, a bitrate associated with an encoding of inter-coded frames for the specific portion may, since the trees are swaying, be high. Thus, the motion base level in the specific portion comprising swaying trees may be high.

By using bitrates of inter coded frames, the amount of change in the portion of the scene may be indicated. The change in the portion of the scene may be related to the motion level in the portion of the scene.

An advantage by using the bitrate of inter coded frames may be that no additional processing of the video stream is needed in order to set the motion trigger level for the different portions of the scene. Encoding of a video stream is routinely performed in order to save digital storage space, storing the video stream on a digital memory, or in order to save bandwidth transmitting the video stream over a digital network.

The act of determining a motion base level may comprise: basing the motion base level on a time average of the bitrate associated with the encoding of block of pixels pertaining to the specific portion of the scene.

By using a time average of the bitrate associated with the encoding of block of pixels pertaining to the specific portion of the scene, the motion base level may be determined according to a level of motion usually present in the specific portion of the scene. For example, a specific portion of a scene including motion associated with tree leaves constantly moving in the wind may influence the motion base level in the specific portion accordingly. A specific portion of a scene including no motion, e.g. an empty driveway, may influence the motion base level in the specific portion.

By using a time average of the bitrate associated with the encoding of block of pixels pertaining to the specific portion of the scene, the motion base level may not be influenced by real events occurring. A real event may not be noticeable in the time average of the bitrate associated with the encoding of block of pixels pertaining to the specific portion of the scene, and may not influence the motion base level in the specific portion of the scene. Hence, even if there are true events occurring during the time used for evaluating the statistical features, these events will not in any great extent influence the motion base level. One or a few events happening during the time used for evaluating the statistical features will be evened out in the statistical sample. This is of advantage since, calibration using an event free environment is not needed. The motion base level may be determined from data collected during a normal monitoring set-up.

The method may further comprise: adjusting a master threshold weight so as to enable adjustment of the motion trigger levels.

The master threshold weight may be a scale factor and/or a constant offset.

By adjusting the master threshold weight, it may be possible to globally adjust the motion trigger levels. This may be beneficial as it enables fine-tuning of the determined motion trigger level. In case there are triggers related to false alarms, the master threshold weight may be adjusted. The master threshold weight may affect the motion trigger level such that the number of triggers related to false alarms may be reduced. In case there are no triggers related to real events, the master threshold weight may be adjusted. The master threshold weight may affect the motion trigger level such that the number of triggers related to real events may be increased.

By adjusting the master threshold weight, it may be possible to globally adjust the motion trigger level. This may be beneficial if the motion level in a scene is higher than normal, without there being a need for a trigger. For example, a trigger caused by a high motion level related to a flock of birds present in the scene may not be desired.

By adjusting the master threshold weight, it may be possible to globally adjust the motion trigger level. This may be beneficial if the motion level in a scene is lower than normal. The motion trigger level may then be adjusted to a lower setting.

The method may further comprise: logging the statistical features of bitrate associated with the encoding of block of pixels as a heatmap of the scene.

An advantage by logging the statistical features of bitrate associated with the encoding of block of pixels as a heatmap of the scene, may be that the motion detected in a video stream of the scene may be saved. A graphical representation of the saved motion heatmap may also be overlayed on top of a graphical representation of the video stream, thereby highlighting motion features in the scene, or in a portion of the scene. The heatmap may also indicate different levels of detected motion in the scene. The levels of the heatmap may also be set relative to the motion base level in each portion of the scene. The heatmap may also highlight objects with motion levels above the motion trigger level.

A block of pixels may correspond to one or more coding units.

An advantage by using one or more coding units as block of pixels may be that the processing needed may be reduced. "Coding units" may be construed as macroblocks or as coding tree units. Other representations of a coding unit may be used. The block of pixels may be an integer amount of coding units.

The act of determining a motion base level may comprise: basing the motion base level on a specific time in a recurrent time period. The specific time in a recurrent time period may be construed as one or more of the following: the time of day, day of week, day of month, week of year, month of year, day of year, holiday, and/or season.

An advantage of basing the motion base level on a specific time in a recurrent time period may be that the motion in a portion of the scene may alternate during the recurrent time period. For example, there may be less motion in the scene on a holiday, and the motion base level may be adjusted accordingly. There may be more motion in a portion of the scene comprising e.g. a tree during summer, since the tree may have leaves that are constantly moving in the wind.

The act of determining a motion base level may comprise: basing the motion base level on a specific time of a recurrent time period and on a time average of the bitrate associated with the encoding of block of pixels pertaining to the specific portion of the scene and pertaining to the specific time in the recurrent time period.

The motion base level for the specific time in the recurrent time period may therefore be determined based on the motion, detected over time, in a specific portion of the scene. For example, one motion base level may be determined based on the time average of the motion detected during several weekends. A different motion base level for the same specific portion of the scene may be determined based on the time average of the motion detected during several weekdays. It may therefore be possible to determine the motion base level to account for different levels of motion in the same portion of the scene during different specific times in a recurrent time period. It may also be possible to determine the motion base level to account for different levels of motion during the same specific time in a recurrent time period in different portions of the scene.

The act of setting the motion trigger level may comprise: basing the motion trigger level on a specific time in a recurrent time period.

It may be possible to adjust the motion trigger level depending on the specific time in the recurrent time period. For example, it may be possible to set a specific motion trigger level for a specific portion during the day, and a different motion trigger level during the night. This may be advantageous since the motion in a scene may be different depending on the specific time in a recurrent time period, e.g. the time of day, or the day of the week.

According to a second aspect the present disclosure relates to a circuitry configured to set a motion trigger level to be used in detection of motion in a video stream depicting a scene. The circuitry comprising: a data receiver configured to receive data pertaining to a video stream depicting the scene, wherein each image frame of the video stream comprises multiple blocks of pixels; a scene divider configured to divide the scene into a plurality of specific portions, wherein each specific portion of the scene is associated with one or more block of pixels; a statistical feature evaluator configured to, for each specific portion of the scene, evaluate, over time, statistical features of bitrate associated with a encoding of block of pixels pertaining to the specific portion of the scene; a motion base level determinator configured to, for each specific portion of the scene, determine a motion base level based on the bitrate associated with the encoding of block of pixels pertaining to the specific portion of the scene; and a motion trigger level controller configured to, for each specific portion of the scene, set a motion trigger level based on the motion base level for the corresponding specific portion of the scene.

The circuitry may comprise an encoder configured to encode the video stream depicting the scene using intra- and inter-coding.

The data receiver may comprise an image sensor configured to capture the video stream depicting the scene.

By comprising an image sensor, the capturing of the video stream may be performed by a device comprising the circuitry that performs the evaluation and motion detection. For example, the circuitry may be comprised in a camera with a processing unit configured to perform the method or methods disclosed above.

The above mentioned features and advantages of the method, when applicable, apply to this second aspect as well. In order to avoid undue repetition, reference is made to the above.

According to a third aspect the present disclosure relates to a non-transitory computer readable storing medium having stored thereon a program for implementing any one of the methods described in the text above, when executed on a device having processing capabilities.

The above mentioned features and advantages of the method, when applicable, apply to this third aspect as well. In order to avoid undue repetition, reference is made to the above.

According to a fourth aspect the present disclosure relates to a method for motion detection. The method comprising:

installing a camera configured to capture a video stream depicting a scene, setting, according to the method of the first aspect, a motion trigger level associated with a specific portion of the scene, triggering a motion event upon a bitrate associated with an encoding of block of pixels pertaining to a specific portion of the scene is above the motion trigger level associated with the specific portion of the scene.

Triggering a motion event may be the result of a real event occurring. The act of setting, according to the method of the first aspect, a motion trigger level associated with a specific portion of the scene, may be performed in a calibration phase. The act of triggering a motion event upon a bitrate associated with an encoding of pixels pertaining to a specific portion of the scene is above the motion trigger level associated with the specific portion of the scene, may be performed in a motion detection phase. The motion detection phase may occur after the calibration phase. The motion trigger level may be updated during the motion detection phase, by repeating or resuming the calibration phase. Repeating or resuming the calibration phase may be done while continuing the motion detection phase. Thus, it may be possible to detect motion while in the calibration phase. The act of setting, according to the method of the first aspect, a motion trigger level associated with a specific portion of the scene, may further be performed for a plurality of specific portions of the scene.

By setting motion trigger levels associated with a specific portion of the scene for a plurality of specific portions of the scene, it may be possible to adjust the motion trigger levels for each specific portion of the scene. Therefore, the triggering of motion events may be performed relative to the normal motion level in each specific portion of the scene. For example, a specific motion level in a first specific portion of the scene may not trigger a motion event, while the specific motion level in a second specific portion of the scene may trigger a motion event.

The act of setting a motion trigger level may further be performed during a predetermined time period. The predetermined time period may be of the order of hours, days, or weeks. The predetermined time period may be the calibration phase. It is to be understood that the calibration phase may be repeated or resumed during the motion detection phase. The calibration phase may be repeated at a specific time in a recurrent time period. For example, the calibration phase may be repeated on the Monday of every fourth week. The repetition of the calibration phase may be manually initiated. For example, it may be desired to update the motion trigger level in case many false alarms occur.

The act of triggering may further be performed after the predetermined time period. The act of triggering may be performed during the motion detection phase.

The above mentioned features and advantages of the method, when applicable, apply to this fourth aspect as well. In order to avoid undue repetition, reference is made to the above.

A further scope of applicability of the present teachings will become apparent from the detailed description given below. However, it should be understood that the detailed description and specific examples, while indicating preferred embodiments, are given by way of illustration only, since various changes and modifications within the scope of the teachings will become apparent to those skilled in the art from this detailed description.

Hence, it is to be understood that the teachings herein are not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects will now be described in more detail, with reference to appended drawings showing different embodiments. The figures should not be considered limited to the specific embodiment; instead they are used for explaining and understanding the teachings.

As illustrated in the figures, the sizes of layers and regions are exaggerated for illustrative purposes and, thus, are provided to illustrate the general structures of embodiments. Like reference numerals refer to like elements throughout.

DETAILED DESCRIPTION

The teachings will be set forth more fully hereinafter with reference to the accompanying drawings, in which current embodiments are shown. However, the teachings may be embodied in many different forms and should not be construed as limited to the embodiments set forth herein; rather, these embodiments are provided for thoroughness and completeness, and to fully convey the scope to the skilled person.

Figure 1:
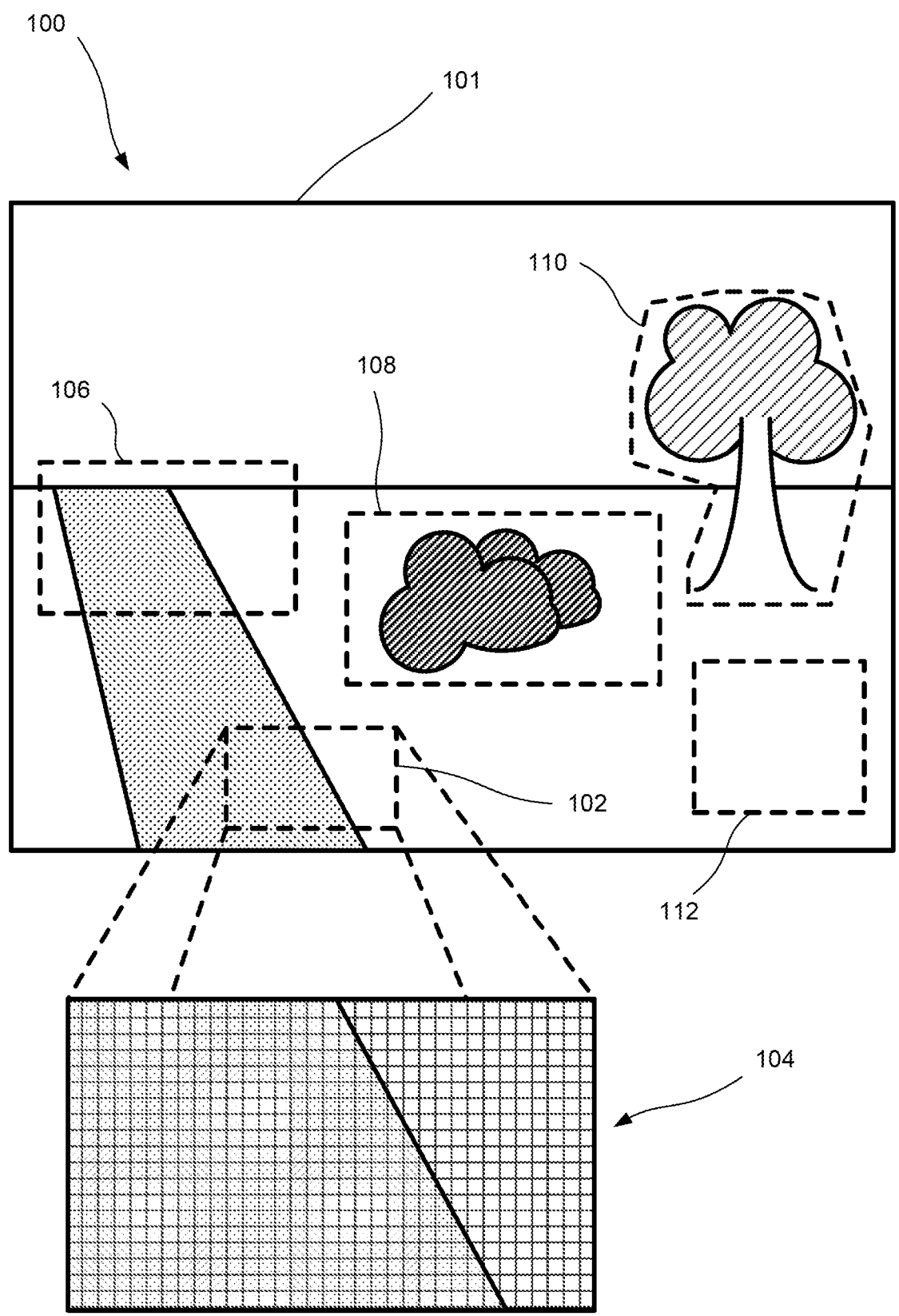
FIG. 1 illustrates an image frame from a video stream depicting a scene.

FIG. 1 illustrates an image frame 101 from a video stream depicting a scene 100. The data of the image frame is represented as pixel data. This data may be encoded using video coding. This in order for the video stream to take less storage space upon storing of the video stream on a digital storage medium and/or less bandwidth upon transmitting the video stream over a digital network. As mentioned above, during the encoding two main modes are typically used to compress a video frame of the video stream of video frames: the Intra-mode and the Inter-mode. Usually, a frame to be encoded is partitioned into independent blocks of pixels being compressed and encoded individually. According to a non-limiting example, a block of pixels may comprise one or more coding units. A coding unit may e.g. be a macroblock or a coding tree unit. Other representations of a coding unit may be used. During the encoding, bitrates for the different blocks of pixels may be determined. The scene 100 comprises multiple specific portions 102, 106, 108, 110, 112. As schematically illustrated in FIG. 1, the specific portion 102, partly depicting a road, is composed by a block of pixels 104. Each of the other specific portions 106, 108, 110, 112 is also composed by a respective block of pixels. Each specific portion may comprise one or more block of pixels. Since the different specific portions 102, 106, 108, 110, 112 have their respective blocks of pixels, the bitrates associated with encoding the blocks of pixels for each specific portion 102, 106, 108, 110, 112 can be identified. The bitrates pertaining to each specific portion 102, 106, 108, 110, 112 may therefore be used when determining a motion base level in respective specific portion 102, 106, 108, 110, 112.

For example, the specific portion 106 comprises a road, which may have more traffic during the day compared to during the night. Likewise, the traffic may change depending on the day of the week. The motion base level may therefore depend on the time of day and/or the day of the week. Another example is specific portion 108 comprising bushes. The motion base level in specific portion 108 may depend on the season, since the bushes may not have trembling leaves during winter. As shown for the specific portion 110, the scene 100 may be divided into specific portions of freeform shape. The specific portion 112 comprises an area where no motion may be expected. Thus, in a single scene 100, there may be different specific portions 102, 106, 108, 110, 112 having different motion base levels and requirements on a corresponding motion trigger level.

Figure 2:
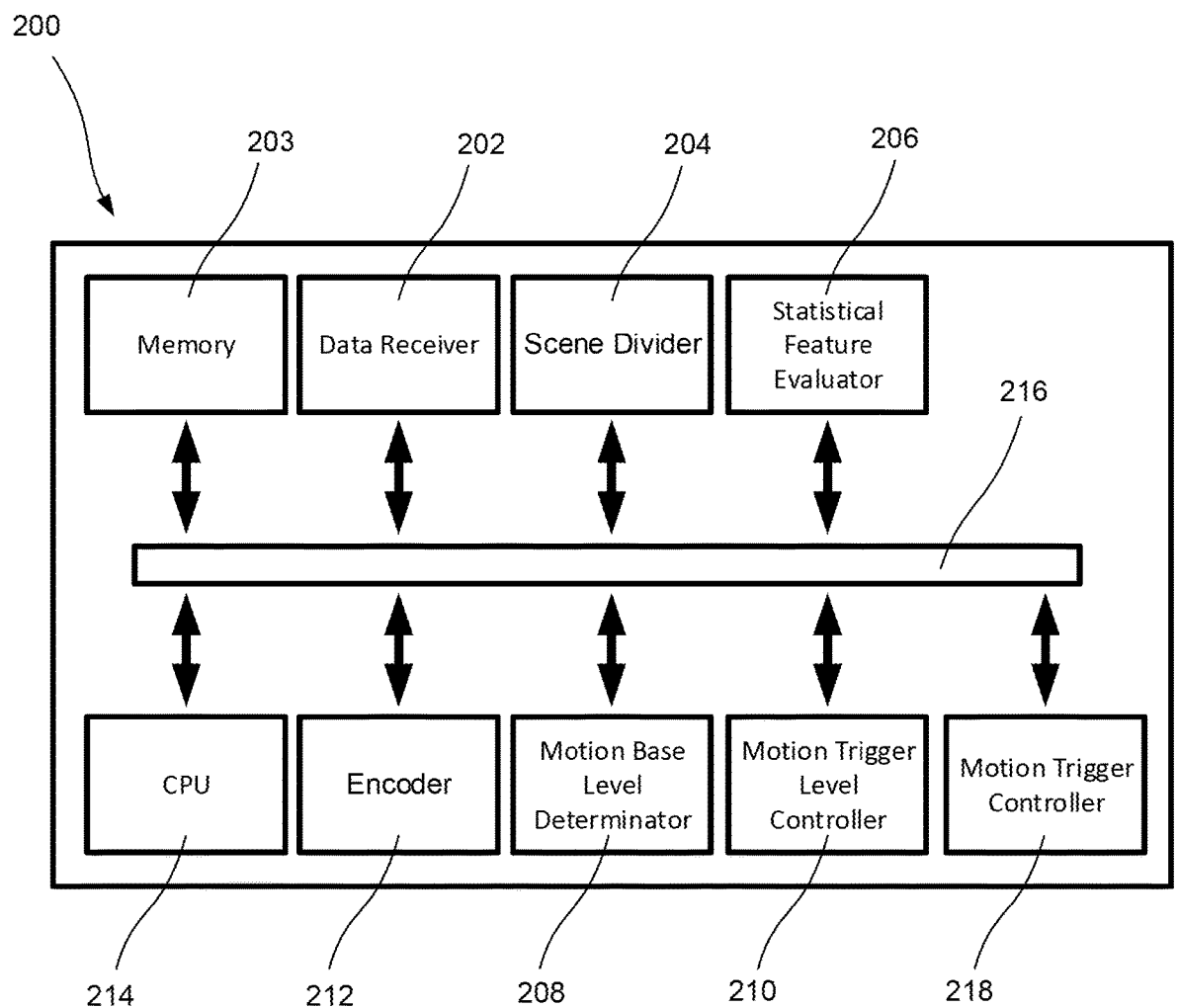
FIG. 2 is a block diagram of a circuitry configured to set a motion trigger level.

FIG. 2 illustrates a circuitry 200 configured to set a motion trigger level to be used in detection of motion in a video stream depicting a scene.

The circuitry 200 may be arranged in a camera configured to capture the video stream depicting the scene. Alternatively, the circuitry 200 may be arranged in a device separate from the camera. If so, the device may be configured to receive data from the camera via a digital network or via any other kind of connection between the camera capturing the video stream and the device comprising the circuitry 200. The scene may e.g. be a scene like the scene 100 illustrated in FIG. 1.

The circuitry 200 comprises data receiver 202, a memory 203, a scene divider 204, a statistical feature evaluator 206, a motion base level determinator 208, and a motion trigger level controller 210. The circuitry 200 may further comprise one or more processors 214. Each of the one or more processors 214 may be a single core processor or a multicore processor. Each of the one or more processors 214 may be any suitable processor for performing digital data processing. The circuitry 200 may further comprise an encoder 212. The encoder may be configured to encode pixel data of the video stream into an encoded version of the video stream using intra and inter mode encoding as discussed above. The circuitry 200 may further comprise a motion trigger controller 218. The motion trigger controller 218 may trigger a motion event upon a bitrate associated with the encoding of block of pixels pertaining to the specific portion of the scene is above the motion trigger level associated with the specific portion of the scene. The circuitry 200 may be configured to trigger motion events by comprising the motion trigger controller 218.

Any one of the data receiver 202, the scene divider 204, the statistical feature evaluator 206, the motion base level determinator 208, the motion trigger level controller 210, and the motion trigger controller 218 may be implemented as a dedicated hardware circuit and/or software module. In case of being a software module the software may be run on the one or more processors 214. It shall also be noted that any dedicated hardware circuit may in part comprise software portions being run on the one or more processors 214.

The memory 203 may be any kind of volatile or non-volatile memory. Further, the memory 203 may comprise a plurality of memory units. The memory 203 may be used as a buffer memory for buffering data while performing processing by the one or more processors 214. The memory 203 may be used as a buffer memory for buffering data while performing processing by one or more of the data receiver 202, the scene divider 204, the statistical feature evaluator 206, the motion base level determinator 208, the motion trigger level controller 210, and the motion trigger controller 218.

The memory 203, the one or more processors 214, the data receiver 202, the scene divider 204, the statistical feature evaluator 206, the motion base level determinator 208, the motion trigger level controller 210, and the motion trigger controller 218 may be arranged to communicate with each other over a data bus 216.

The data receiver 202 is configured to receive data pertaining to a video stream depicting a scene. The scene may be the scene 100 as depicted in FIG. 1. The received data may be a previously encoded video data representing the video stream. Alternatively, the received data may be pixel data representing the different pixels of an image sensor used for capturing the video stream. The pixel data is yet not encoded. Each image frame of the video stream comprises multiple blocks of pixels. In case of the data comprising previously encoded video data, the data may further comprise information pertaining to bitrates associated with the encoding of the different block of pixels of the video stream. The information pertaining to bitrates associated with the encoding of the different block of pixels of the video stream may be time resolved.

The received data may be stored in the memory 203.

The scene divider 204 is configured to divide the scene into a plurality of specific portions. Each of the specific portions is associated with one or more of the multiple block of pixels. The plurality of specific portions may e.g. be regions of the scene being of interest. The whole scene may be divided into the plurality of specific portions. Alternatively, only part of the scene may be divided into the plurality of specific portions. The specific portions may have equal area, i.e. comprising equal number of pixels (or block of pixels). The specific portions may have equal shape. For example, all specific portions may be quadrangles. The specific portions may have different shapes. The shape may be any one of a quadrangle, a rhomb, a circle, and a free form shape. The different specific portions may have different normal motion levels. The different specific portions may be portions of the scene of increased, or decreased, interest. In other words, from a monitoring point of view there may be different requirements on each of the specific portions of the scene. The scene divider 204 may be operated based on user input. For example, a user may define one or more specific portions in a graphical representation of the video stream. Alternatively, the scene divider 204 may be configured to define different specific regions of the scene using e.g. a feature detection algorithm detecting features in the scene. The feature identification algorithm may cluster block of pixels in order to cover the identified feature. The clustered block of pixels may be proposed as a specific portion of the scene. The clustered block of pixels may be automatically divided into a specific portion of the scene. Example of such feature may e.g. be a road, a tree, a fence, and/or an entrance to a house.

The statistical feature evaluator 206 is configured to, for each specific portion of the scene, evaluate, over time, statistical features of bitrate associated with an encoding of block of pixels pertaining to the specific portion of the scene. The statistical feature evaluator 206 may use information pertaining to bitrates associated with the encoding of the different block of pixels of the video stream received by the data receiver 202. Alternatively, the circuitry 200 may be configured to encode pixel data pertaining to the video stream depicting a scene using the encoder 212. The statistical feature evaluator 206 is then configured to receive statistical features of bitrate associated with the encoding of block of pixels pertaining to the specific portions of the scene from the encoder 212. The, from the encoder 212, received statistical features are then evaluated, over time, by the statistical feature evaluator 206. Hence, the statistical feature evaluator 206 is configured to produce time resolved statistical features of the bitrates associated with the encoding of the different block of pixels of the video stream. The time period over which the evaluation of statistical features occurs may be manually selected by a user operating the circuitry 200. The time period over which the evaluation of statistical features occurs may be predetermined. The time period may, e.g., be a certain number of seconds, minutes, hours, days, weeks, months, or years. The statistical features may, e.g., comprise moving averages, such that the evaluation of statistical features occurs essentially continuously. The statistical features may also be determined in a cumulative manner. Thereby, over time, increasing the data set upon which the statistical features are based on. The encoding of block of pixels may either be intra-mode encoding or inter-mode encoding. The bitrates associated with the encoding of block of pixels may be different for each specific portion, and therefore indicate the motion level in respective specific portion. Thus, it is possible that a first bitrate pertaining to a first specific portion of the scene is relatively high, and simultaneously a second bitrate pertaining to a second specific portion of the scene is relatively low. This may be interpreted as the motion level in the first specific portion is relatively high, while the motion level in the second specific portion is relatively low. It should be understood that the bitrates pertaining to the different specific portions may vary independently of one another.

The motion base level determinator 208 is configured to, for each specific portion of the scene, determine a motion base level based on the evaluated statistical features of bitrate associated with the encoding of block of pixels pertaining to the specific portion of the scene. The motion base level may therefore be based on the output from the statistical feature evaluator 206. The motion base level may be, e.g., a single statistical feature, or a combination of a plurality of statistical features. Thus, the motion base level may be the arithmetic mean over a certain time period, such as, e.g., one hour. The motion base level may also be formed from a combination of a first statistical feature, e.g. the arithmetic mean, and a second statistical feature, e.g. the standard deviation. It is to be understood that a plurality of different mathematical combinations of the statistical features is possible. It is to be understood that any one of the statistical features may be scaled by constant and/or variable factors. It is to be understood that any one of the statistical features may be offset by constant and/or variable terms. Thus, the motion base line may be shifted by, e.g., adding a constant, and scaled by, e.g., multiplying with a factor varying over time.

The motion trigger level controller 210 is configured to, for each specific portion of the scene, set a motion trigger level based on the motion base level for the corresponding specific portion of the scene. The motion trigger level may therefore be set relative to the motion base level. For example, the motion trigger level may include one or more of the evaluated statistical features that were the output from the statistical feature evaluator 206. One non-limiting example of a motion trigger level in a specific portion of a scene comprise setting the motion trigger level as the sum of the motion base level in the specific portion of the scene and a multiple of the standard deviation of the bitrate pertaining to the specific portion of the scene. It is to be understood that many different combinations of the evaluated statistical features, output from the statistical feature evaluator 206, can be used in forming the motion trigger level.

The motion trigger controller 218 may be configured to trigger a motion event upon a bitrate associated with the encoding of block of pixels pertaining to the specific portion of the scene is above the motion trigger level associated with the specific portion of the scene. The motion trigger controller 218 may compare the motion trigger level in the specific portion of the scene with the bitrate associated with the encoding of block of pixels in the specific portion of the scene. Thereby, the motion trigger controller 218 may trigger motion events in case the bitrate associated with the encoding of block of pixels in the specific portion of the scene is above the motion trigger level associated with the specific portion of the scene. The motion trigger controller 218 may trigger motion events in one or more specific portions of the scene. It is to be understood that the motion trigger controller 218 may trigger motion events in one or more specific portions of the scene independent of other specific portions of the scene.

The circuitry 200 is therefore capable of individually setting motion trigger levels customized to the motion base levels in the respective one of the plurality of specific portions in the scene.

The circuitry 200 may further be capable of individually triggering motion events by comprising the motion trigger controller 218.

Figure 3:
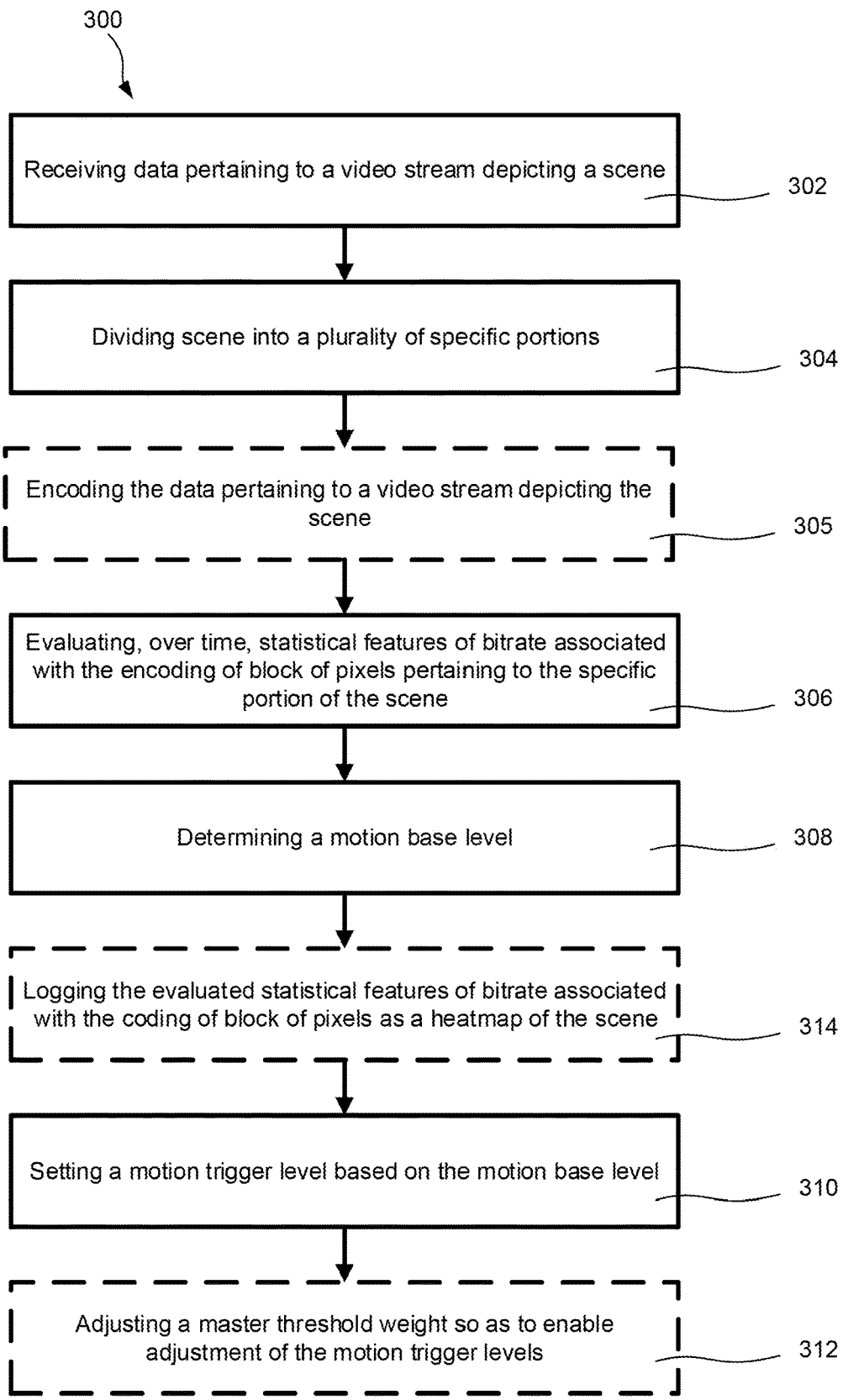
FIG. 3 is a flow block scheme of a method for setting a motion trigger level.

FIG. 3 is a flow block scheme of a method 300 for setting a motion trigger level to be used in detection of motion in a video stream depicting a scene. The method 300 comprising the following acts:

Receiving 302 data pertaining to a video stream depicting the scene. The scene may be the scene 100 as depicted in FIG. 1. The data may be encoded before being received 302. The data may be encoded after being received 302. Each image frame of the video stream comprises multiple blocks of pixels. A block of pixels may correspond to one or more coding units. A coding unit may, e.g., be a macroblock or a coding tree unit. In case of the data comprising previously encoded video data, the data may further comprise information pertaining to bitrates associated with the encoding of the different block of pixels of the video stream. The information pertaining to bitrates associated with the encoding of the different block of pixels of the video stream may be time resolved.

The specific portions of the scene may depict different regions of interest in the scene. The specific portions of the scene may have different normal motion levels. The act of dividing 304 the scene into a plurality of specific portions may be based on user input. The act of dividing 304 the scene into a plurality of specific portions may be made based on features identified in the scene. The features may be identified by a feature identification algorithm. The feature identification algorithm may cluster block of pixels in order to cover the identified feature. The clustered block of pixels may be proposed as a specific portion of the scene. The clustered block of pixels may be automatically divided into a specific portion of the scene. Examples of features may e.g. be a road, a tree, a fence, and/or an entrance to a house. Each specific portion of the scene is associated with one or more block of pixels. Thus, the act of dividing 304 the scene into a plurality of specific portions thereby assigns blocks of pixels to the specific portions.

For each specific portion of the scene, evaluating 306, over time, statistical features of bitrate associated with an encoding of block of pixels pertaining to the specific portion of the scene. The evaluation 306 may be based on information pertaining to bitrates associated with the encoding of the different block of pixels of the video stream received in connection with the act of receiving 302. Alternatively, the evaluation 306 may be based on statistical features of bitrate associated with the encoding of pixel data of block of pixels received in connection with the act of receiving 302. The time period over which the evaluation of statistical features occurs may be selected by a user. Alternatively, the time period may be a predetermined time period. The time period may, e.g., be a certain number of seconds, minutes, hours, days, weeks, months, or years. The statistical features may, e.g., comprise moving averages, such that the evaluation of statistical features occurs essentially continuously. The statistical features may also be determined in a cumulative manner. Thereby the data set upon which the statistical features are based on, may increase over time. The bitrates associated with the encoding of block of pixels may be different for each specific portion, and therefore indicate the motion level in respective specific portion. Thus, it is possible that a first bitrate pertaining to a first specific portion of the scene is relatively high, and simultaneously a second bitrate pertaining to a second specific portion of the scene is relatively low. This may be interpreted as the motion level in the first specific portion is relatively high, while the motion level in the second specific portion is relatively low. It should be understood that the bitrates pertaining to the different specific portions may vary independently of one another. The statistical features of bitrate associated with the encoding of block of pixels may be primarily acquired from inter-coded frames. The statistical features of bitrate associated with the encoding of block of pixels may be solely acquired from inter-coded frames.

For each specific portion of the scene, determining 308 a motion base level based on the evaluated statistical features of bitrate associated with the encoding of block of pixels pertaining to the specific portion of the scene. The motion base level may, e.g., be the arithmetic mean of the bitrate, monitored for, e.g., an hour, associated with the encoding of block of pixels. It is to be understood that the motion base level may be updated regularly, e.g. on a specific hour every day, on a specific day every week, or on any specific time in a recurrent time period. The update of the motion base level may be initiated manually by a user. The determining 308 of the motion base level may comprise basing the motion base level on a time average of the bitrate associated with the encoding of block of pixels pertaining to the specific portion of the scene. The motion base level may be based on a specific time in a recurrent time period. The motion base level may be based on a specific time in a recurrent time period and on a time average of the bitrate associated with the encoding of block of pixels pertaining to the specific portion of the scene and pertaining to the specific time in the recurrent time period. Thus, a first motion base level may be determined for a first time period, and a second motion base level may be determined for a second time period. For example, the first motion base level may be determined for daytime, and the second motion base level may be determined for nighttime. The first and second motion base levels may be determined based on time averages of the bitrates associated with the encoding of block of pixels pertaining to the specific portion of the scene and pertaining to respective specific time in the recurrent time period.

For each specific portion of the scene, setting 310 a motion trigger level based on the motion base level. The motion trigger level may be based on a specific time in a recurrent time period. It is to be understood that the motion trigger level may be updated regularly, e.g. on a specific hour every day, on a specific day every week, or on any specific time in a recurrent time period. The update of the motion trigger level may be initiated by a user. It is to be understood that an update to the motion base level may adjust the motion trigger level accordingly.

The method 300 may further comprise adjusting 312 a master threshold weight so as to enable joint adjustment of the motion trigger levels for all of the specific portions of the scene. Thus, it is possible to globally adjust the motion trigger levels by adjusting 312 the master threshold weight.

The method 300 may further comprise logging 314 the evaluated statistical features of bitrate associated with the encoding of block of pixels as a heatmap of the scene. The act of logging 314 the heatmap may comprise saving it onto a memory. The memory may be the memory 203 of the circuitry discussed in connection with FIG. 2. The levels of the heatmap may be set relative to a global motion base level in the scene. The levels of the heatmap may be set relative to the motion base level in each specific portion of the scene. Thereby the levels of motion in the scene may be logged, in order to retrieve historical motion levels.

Figure 4:
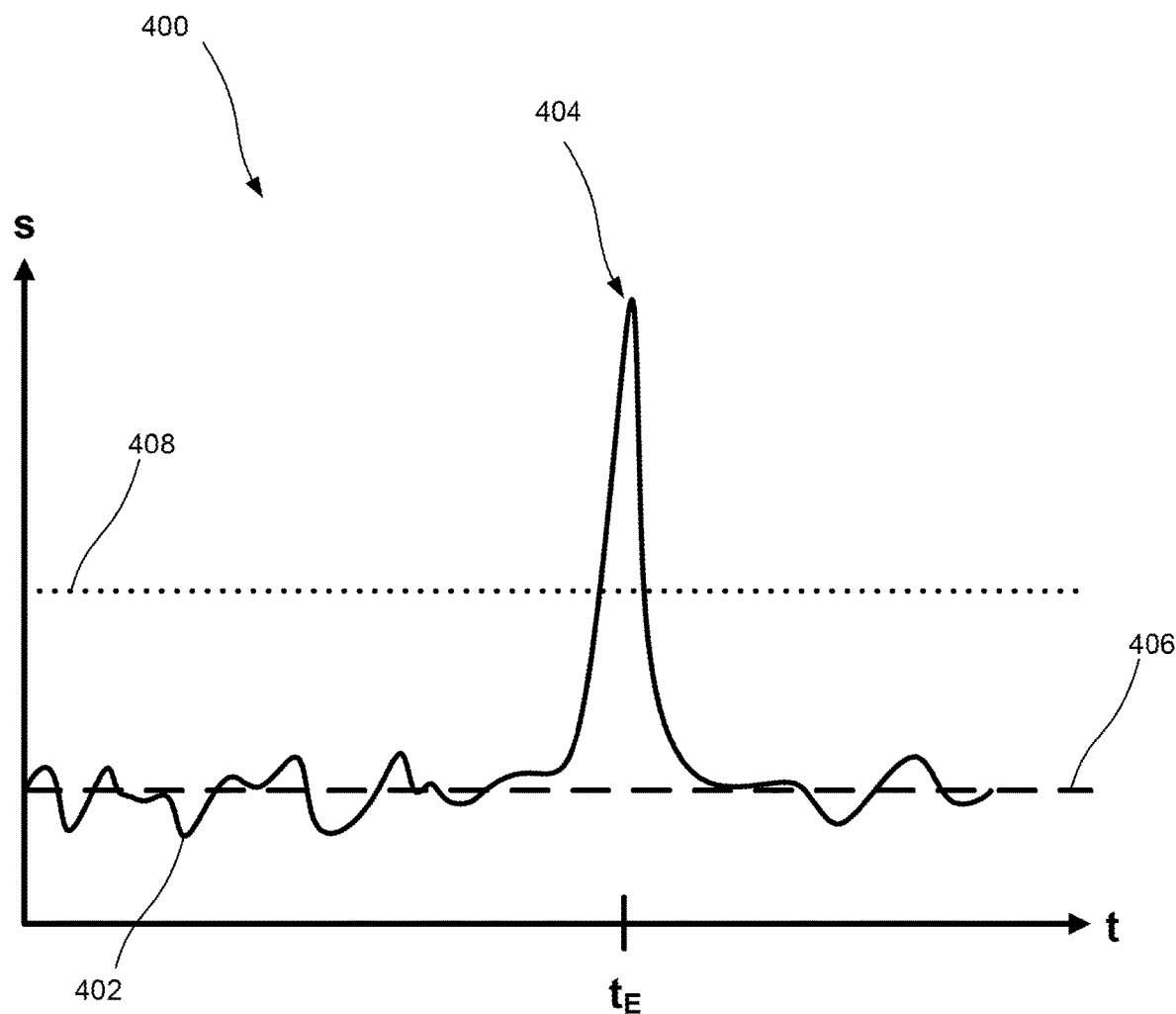
FIG. 4 illustrates a diagram of a graphical representation of bitrate, s, over time, t.

FIG. 4 illustrates a diagram 400 of graphical representation of bitrate, s, over time, t, for a specific portion of the scene. Needless to say, every specific portion of the scene may have its unique diagram of graphical representation of bitrate, s, over time, t. The diagram 400 comprises a graphical representation 402 of the bitrate associated with the encoding of block of pixels pertaining to a specific portion of the scene. A motion base level 406 and a motion trigger level 408 is also illustrated in FIG. 4. The graphical representation 402 of the bitrate varies over time. Around the time $t_E$, the graphical representation 402 of the bitrate peaks 404. The peak 404 of the graphical representation 402 of the bitrate is above the motion trigger level 408. Thus, an event causing a trigger occurs around the peak 404.

Figure 5:
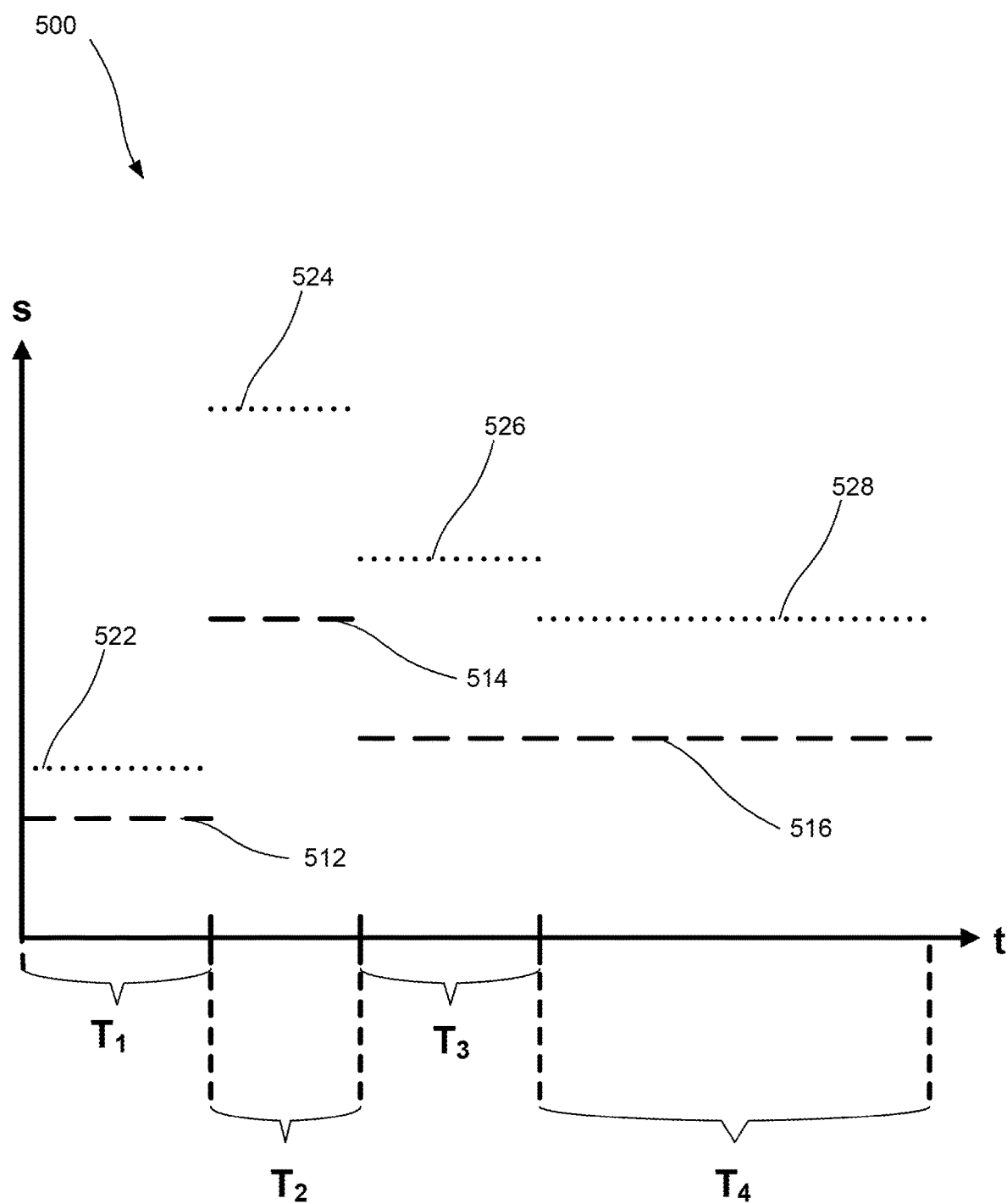
FIG. 5 illustrates a diagram with multiple motion base levels and multiple motion trigger levels.

FIG. 5 illustrates a diagram 500 with multiple motion base levels and multiple motion trigger levels for a specific portion of the scene. Again, every specific portion of the scene may have its unique motion base levels and multiple motion trigger levels. The time period $T_1$ in the diagram 500 has motion base level 512 and corresponding motion trigger level 522. The motion trigger level 522 lies relatively close to the motion base level 512. This configuration is thereby sensitive and will trigger for small amounts of detected motion in the specific portion of the scene. This configuration may, e.g., be active for a scene during the night, where no motion is expected. The motion base level 514 for time period $T_2$ is higher than the motion base level 512. The motion trigger level 524 for time period $T_2$ is higher than the motion trigger level 522. Thus, the configuration during $T_2$ is not as sensitive as the configuration during $T_1$. The configuration during $T_2$ may, e.g., be active for a scene during a morning rush hour. The time periods $T_3$ and $T_4$ has the same motion base level 516. The motion trigger levels 526 and 528 are different. This configuration may, e.g., be active if there are occasional high motion levels in the scene during $T_3$, while not during $T_4$, while the motion base level 516 remains the same.

Figure 6:
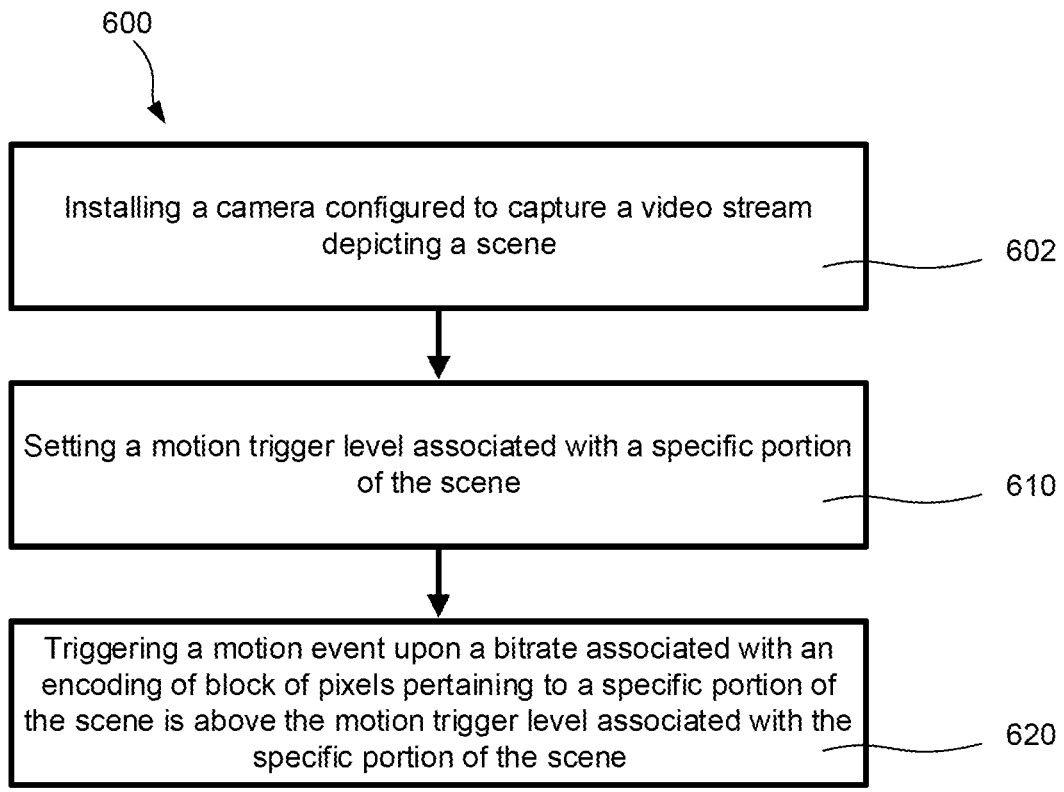
FIG. 6 is a flow block scheme of a method for motion detection.

FIG. 6 is a flow block scheme of a method 600 for motion detection. The method comprising the following acts:

Installing 602 a camera configured to capture a video stream depicting a scene. The scene may be the scene 100 as depicted in FIG. 1. The camera may comprise circuitry 200.

Setting 610, according to the method of the first aspect, a motion trigger level associated with a specific portion of the scene. The specific portions of the scene may depict different regions of interest in the scene. The specific portions of the scene may have different normal motion levels.

Triggering 620 a motion event upon a bitrate associated with an encoding of block of pixels pertaining to a specific portion of the scene is above the motion trigger level associated with the specific portion of the scene. The bitrate associated with the encoding of block of pixels pertaining to a specific portion of the scene may have the graphical representation 402 in FIG. 4. The motion trigger level associated with the specific portion of the scene may have the graphical representation 408 in FIG. 4. Triggering 620 a motion event may be performed close to when the graphical representation 402 of the bitrate peaks 404 and is above the motion trigger level 408.

The act of setting 610, according to the method of the first aspect, a motion trigger level associated with a specific portion of the scene, may further be performed for a plurality of specific portions of the scene.

The act of setting 610 may further be performed during a predetermined time period. The predetermined time period may be in the order of hours, days, or weeks. The predetermined time period may be a calibration phase of the method.

The act of triggering 620 may further be performed after the predetermined time period. The act of triggering 620 may be performed in a motion detection phase of the method. The motion detection phase may occur after the calibration phase. The calibration phase may be repeated or resumed during the motion detection phase.

The person skilled in the art realizes that the teachings herein are by no means limited to the preferred embodiments described above. On the contrary, many modifications and variations are possible within the scope of the appended claims.

For example, the method 300 may comprise the optional act of encoding 305 the received data pertaining to the video stream depicting the scene. The encoding is performed using intra and inter mode encoding as discussed above.

Additionally, variations to the disclosed embodiments can be understood and effected by the skilled person in practicing the method and apparatus, from a study of the drawings, the disclosure, and the appended claims.

The invention claimed is:

1. A method for setting a motion trigger level to be used in detection of motion in a video stream depicting a scene, the method comprising:
   receiving data pertaining to a video stream depicting the scene;
   dividing the scene into a plurality of specific portions;
   wherein each image frame of the video stream comprises multiple blocks of pixels, wherein each specific portion of the scene is associated with one or more block of pixels; and
   for each specific portion of the scene:
      evaluating, over time, statistical features of bitrate associated with an encoding of block of pixels pertaining to the specific portion of the scene;
      determining a motion base level based on the evaluated statistical features of bitrate associated with the encoding of block of pixels pertaining to the specific portion of the scene; and
      setting a motion trigger level based on the motion base level.

2. The method according to claim 1, wherein the statistical features of bitrate associated with the encoding of block of pixels are primarily, preferably solely, acquired from inter coded frames.

3. The method according to claim 1, wherein the act of determining a motion base level comprises:
   basing the motion base level on a time average of the bitrate associated with the encoding of block of pixels pertaining to the specific portion of the scene.

4. The method according to claim 1, the method further comprising:
   adjusting a master threshold weight so as to enable adjustment of the motion trigger levels.

5. The method according to claim 1, the method further comprising:
   logging the evaluated statistical features of bitrate associated with the encoding of block of pixels as a heatmap of the scene.

6. The method according to claim 1, wherein a block of pixels corresponds to one or more coding units.

7. The method according to claim 1, wherein the act of determining a motion base level comprises:
   basing the motion base level on a specific time in a recurrent time period.

8. The method according to claim 1, wherein the act of determining a motion base level comprises:
   basing the motion base level on a specific time of a recurrent time period and on a time average of the bitrate associated with the encoding of block of pixels pertaining to the specific portion of the scene and pertaining to the specific time in the recurrent time period.

9. The method according to claim 1, wherein the act of setting the motion trigger level comprises:
   basing the motion trigger level on a specific time in a recurrent time period.

10. A circuitry configured to set a motion trigger level to be used in detection of motion in a video stream depicting a scene, the circuitry comprising:
   a data receiver configured to receive data pertaining to a video stream depicting the scene, wherein each image frame of the video stream comprises multiple blocks of pixels;
   a scene divider configured to divide the scene into a plurality of specific portions, wherein each specific portion is associated with one or more block of pixels;
   a statistical feature evaluator configured to, for each specific portion of the scene, evaluate, over time, statistical features of bitrate associated with an encoding of block of pixels pertaining to the specific portion of the scene;
   a motion base level determinator configured to, for each specific portion of the scene, determine a motion base level based on the evaluated statistical features of the bitrate associated with the encoding of block of pixels pertaining to the specific portion of the scene; and
   a motion trigger level controller configured to, for each specific portion of the scene, set a motion trigger level based on the motion base level for the corresponding specific portion of the scene.

11. The circuitry according to claim 10, wherein the data receiver comprises an image sensor configured to capture the video stream depicting the scene.

12. A non-transitory computer readable storing medium having stored thereon a program for implementing the following method, when executed on a device having processing capabilities:
   receiving data pertaining to a video stream depicting the scene;
   dividing the scene into a plurality of specific portions;
   wherein each image frame of the video stream comprises multiple blocks of pixels, wherein each specific portion of the scene is associated with one or more block of pixels; and
   for each specific portion of the scene:
      evaluating, over time, statistical features of bitrate associated with an encoding of block of pixels pertaining to the specific portion of the scene;
      determining a motion base level based on the evaluated statistical features of bitrate associated with the encoding of block of pixels pertaining to the specific portion of the scene; and
      setting a motion trigger level based on the motion base level.

13. The non-transitory computer readable storing medium of claim 12, wherein the statistical features of bitrate associated with the encoding of block of pixels are primarily, preferably solely, acquired from inter coded frames.

14. The non-transitory computer readable storing medium of claim 12, wherein the act of determining a motion base level comprises:
    basing the motion base level on a time average of the bitrate associated with the encoding of block of pixels pertaining to the specific portion of the scene.

15. The non-transitory computer readable storing medium of claim 12, further comprising:
    adjusting a master threshold weight so as to enable adjustment of the motion trigger levels.

16. The non-transitory computer readable storing medium of claim 12, further comprising:
    logging the evaluated statistical features of bitrate associated with the encoding of block of pixels as a heatmap of the scene.

17. The non-transitory computer readable storing medium of claim 12, wherein a block of pixels corresponds to one or more coding units.

18. The non-transitory computer readable storing medium of claim 12, wherein the act of determining a motion base level comprises:
    basing the motion base level on a specific time in a recurrent time period.

19. The non-transitory computer readable storing medium of claim 12, wherein the act of determining a motion base level comprises:
    basing the motion base level on a specific time of a recurrent time period and on a time average of the bitrate associated with the encoding of block of pixels pertaining to the specific portion of the scene and pertaining to the specific time in the recurrent time period.

* * * * *